US008572199B2

(12) United States Patent  
Piper et al.

(10) Patent No.: US 8,572,199 B2
(45) Date of Patent: Oct. 29, 2013

(54) DYNAMIC INSTANT COMMENTS

(75) Inventors: Robert W. Piper, Medina, WA (US); Peter Jules Van Caeneghem, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 11/861,688

(22) Filed: Sep. 26, 2007

(65) Prior Publication Data

US 2009/0083383 A1    Mar. 26, 2009

(51) Int. Cl.
*G06F 15/16* (2006.01)
(52) U.S. Cl.
USPC ........................... 709/207; 709/204; 709/205
(58) Field of Classification Search
USPC .......................................... 709/207, 204, 205
See application file for complete search history.

(56) References Cited

U.S. PATENT DOCUMENTS

| 6,405,224 | B1 | 6/2002 | Van Der Meer |
| 6,484,196 | B1 | 11/2002 | Maurille |
| 6,493,703 | B1 | 12/2002 | Knight et al. |
| 7,092,939 | B2 * | 8/2006 | Koll .................................... 1/1 |
| 2003/0194690 | A1 | 10/2003 | Wessner et al. |
| 2004/0049534 | A1 | 3/2004 | Nickerson et al. |
| 2005/0041786 | A1 | 2/2005 | Craig |
| 2005/0198124 | A1 | 9/2005 | McCarthy |
| 2005/0257156 | A1 | 11/2005 | Jeske et al. |
| 2005/0273503 | A1 | 12/2005 | Carr et al. |
| 2006/0031770 | A1 | 2/2006 | McMenamin |
| 2006/0053022 | A1 | 3/2006 | Yao |
| 2006/0053364 | A1 | 3/2006 | Hollander et al. |
| 2006/0064342 | A1 | 3/2006 | Frengut et al. |
| 2006/0156330 | A1 * | 7/2006 | Chiu ............................... 725/24 |
| 2007/0162432 | A1 | 7/2007 | Armstrong et al. |
| 2008/0040673 | A1 | 2/2008 | Zuckerberg et al. |
| 2008/0052634 | A1 * | 2/2008 | Fishkin et al. ................ 715/753 |
| 2008/0086458 | A1 | 4/2008 | Robinson et al. |

FOREIGN PATENT DOCUMENTS

| JP | 2002215975 | 8/2002 |
| JP | 2003186792 | 7/2003 |
| JP | 2004139468 | 5/2004 |
| KR | 20010000774 A | 1/2001 |
| KR | 20010088751 A | 9/2001 |
| KR | 20020012725 A | 2/2002 |
| WO | 0233576 A1 | 4/2002 |
| WO | 2007070791 | 6/2007 |

OTHER PUBLICATIONS

International Search Report and Written Opinion, PCT/US2008/071467, dated Feb. 11, 2009, 4 pages.

(Continued)

*Primary Examiner* — Jude Jean Gilles
*Assistant Examiner* — Jaren M Means
(74) *Attorney, Agent, or Firm* — Senniger Powers LLP

(57) ABSTRACT

Dynamically providing instant comments. A first instruction is received for activating an instant commenting tool for enabling instant commenting on a web media object on an online environment. The web media object is identified by the activated instant commenting tool in response to the received first instruction. An instant comment session is provided for a first user to leave comments to the web media object. The comments from the first user from the provided instant comment session are recorded. The recorded comments are rendered as a persistent portion of the web media object on the online environment.

17 Claims, 11 Drawing Sheets

(56) References Cited

OTHER PUBLICATIONS

Databeam, "T.120 Whitepaper," available at http://www.dtic.mil/ieb_cctwg/contrib-docs/T.120/T.120-WP.html, printed on Dec. 27, 2007, 15 pages.

Microsoft, "Application and Whiteboard Sharing Using Windows Messenger v4.0," available at http://www.microsoft.com/windowsxp/using/windowsmessenger/learnmore/appswbsharing.mspx?pf=true, printed on Dec. 27, 2007, 5 pages.

Business Wire, "DataBeam's shared Whiteboard Toolkit brings application-level interoperability between conferencing products; New Toolkits include industry's first implementation of ITU T.126 document conferencing standard, plus Node Controller and Session Manager Tools," available at http://findarticles.com/p/articles/mi_mOEIN/is_1996_August_26/ai_18615192/, printed on Dec. 27, 2007, 2 pages.

Shi, Hong, "Whiteboard with Java multicast and simplified RTP," available at http://www.cs.columbia.edu/~hgs/teaching/ais/1998/projects/Hong_Shi/report.html, printed on Dec. 13, 2007, 5 pages.

Coleman, Stephen et al., "Appropriate Technologies for Online Engagement," Bowling Together: Online Public Engagement in Policy Deliberation, available at http://bowlingtogether.net/chapter4.html, 2002, 16 pages.

Hansen, Katharine, et al., "Using an Asynchronous Discussion Board for Online Focus Groups: A Protocol and Lessons Learned," 2006 College Teaching & Learning Conference, available at http://www.quintcareers.com/KH_Teaching/ABR_2006.pdf, 2006, 8 pages, USA.

Unknown, "Saba Centra Suite," Saba. The People Management Solution., available at http://www.saba.com/products/centra/, 2007, 2 pages.

Benzinger, Brian, "Qunu Live Support with Web-Based Messaging," available at http://www.solutionwatch.com/432/qunu-live-support-with-web-based-messaging/, Jun. 12, 2006, 7 pages.

Browne, Hilary, et al., "Designing an Interactive Message Board as a Technology Probe for Family Communication," Human-Computer Interaction Lab, Institute for Advanced Computer Studies, available at ftp://ftp.cs.umd.edu/pub/hcil/Reports-Abstracts-Bibliography/2001-20html/2001-20.htm, Sep. 2001, 7 pages, University of Maryland, College Park, MD 20742, USA.

\* cited by examiner

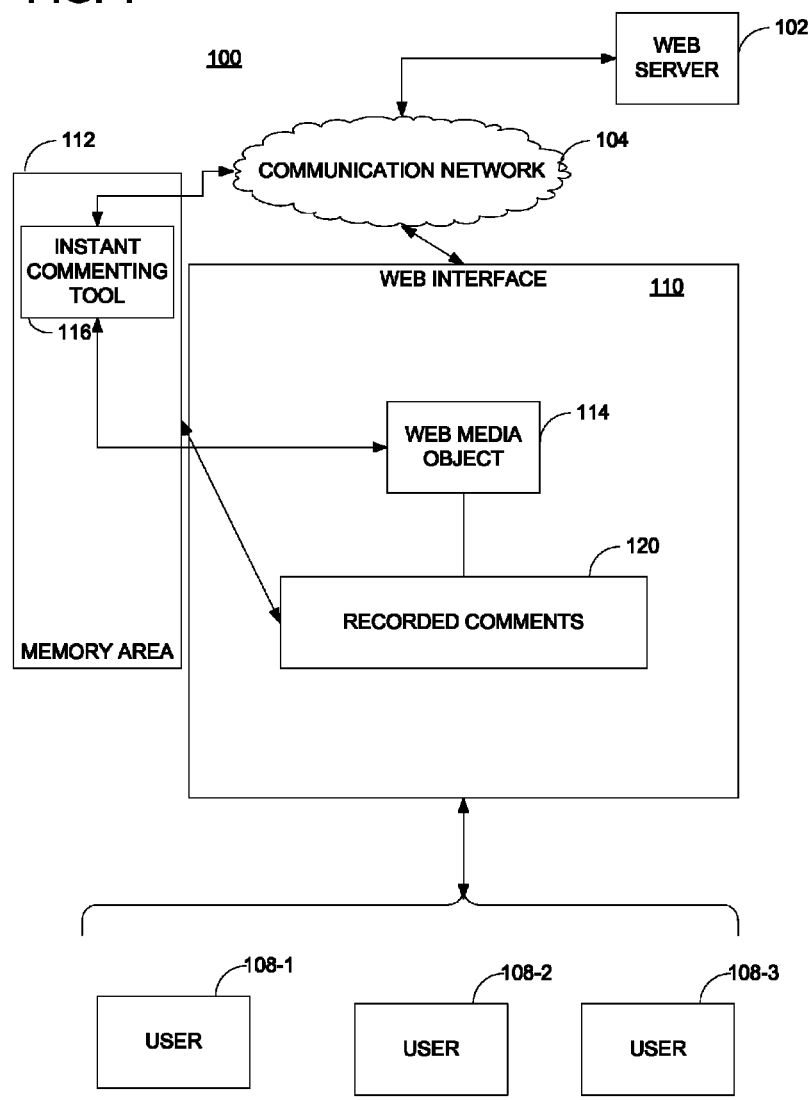

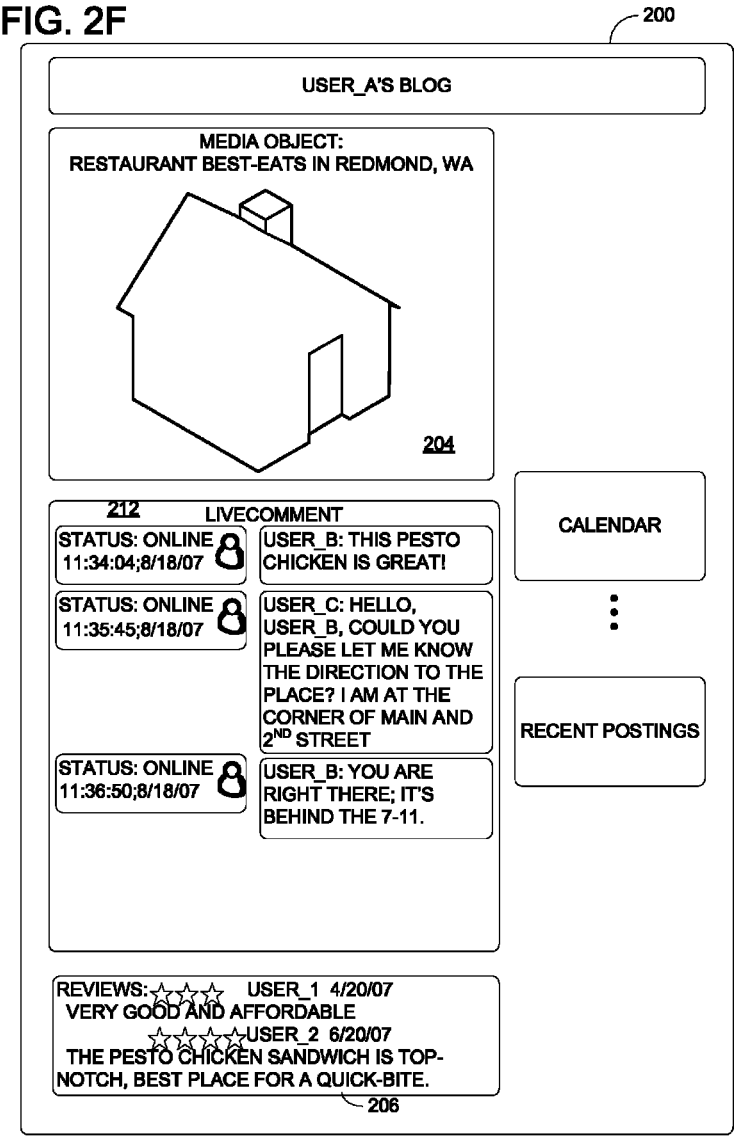

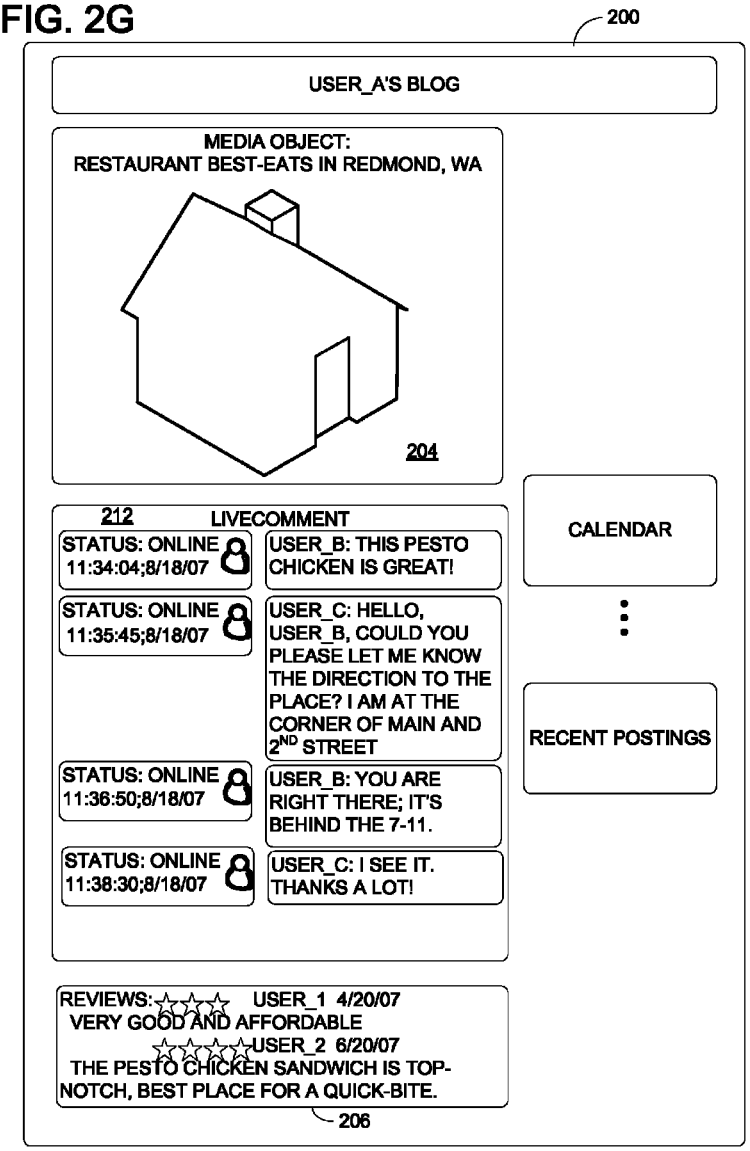

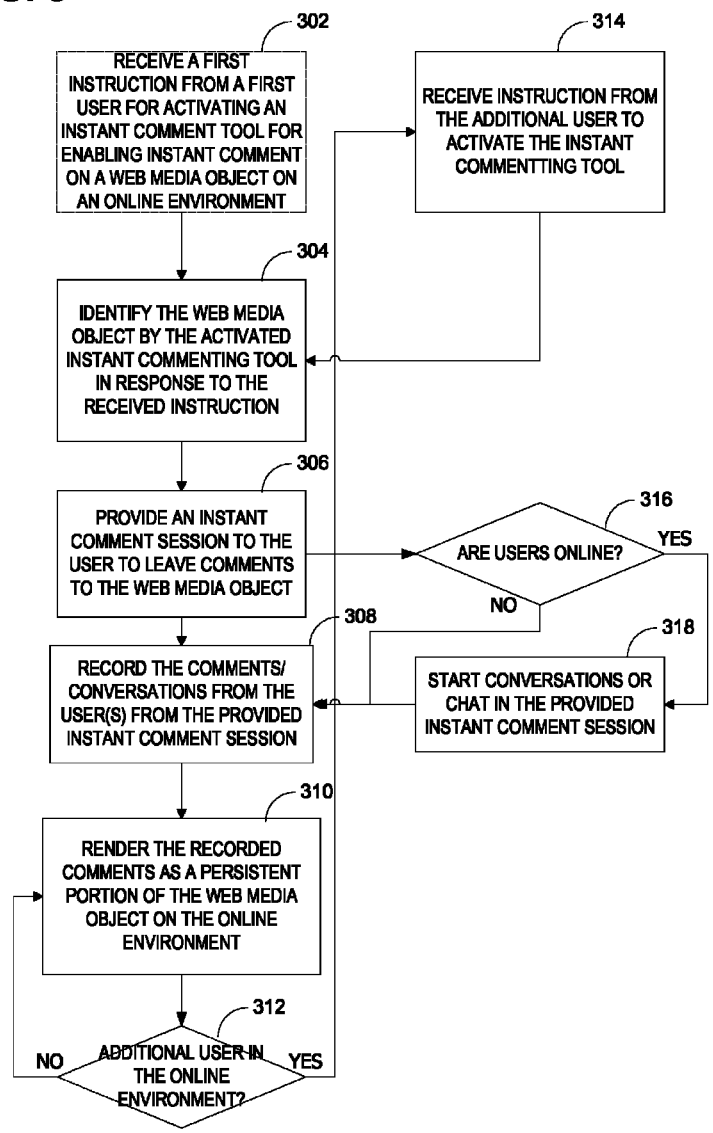

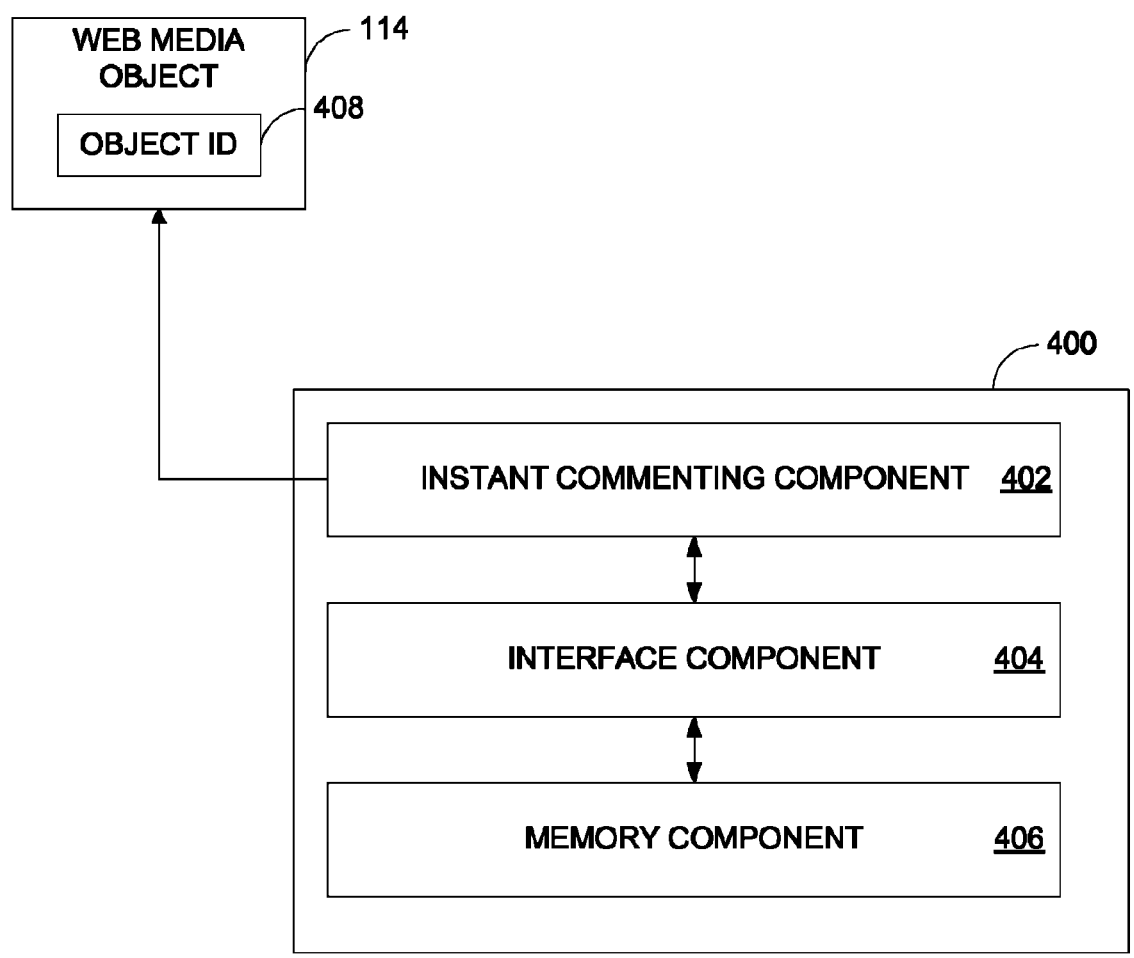

DYNAMIC INSTANT COMMENTS

BACKGROUND

The Internet has greatly changed ways individuals communicate with one another. For example, online message boards, or bulletin board, are now popular forms of communication. Individuals who wish to communicate with others can leave messages or start discussions on a message board and the intended recipient(s) can visit the message board to view posted messages and discussions. Unfortunately, there is usually no privacy; everyone with a proper authorization (e.g., a username and a password) can view any of the messages. The message board also does not openly display an individual's status at a given moment. That is, the message board does not notify an individual other than himself or herself whether someone is in a "signed-in" or "signed-off" status. Furthermore, because the message board is asynchronous, no instantaneous communication is established between individuals unless the sender and the recipient happen to be visiting the message board and leaving messages for each other at the same time. In addition, the message boards are static in the sense that, in order to enjoy the availability of the message boards, users need to visit web portals or web sites to use the service, leave messages, and review messages.

Another Internet-related communication tool is an instant messaging tool. Instant messaging provides an immediate chat or conversation session between parties. The instant messaging tool can be public, such as a public chat room in which parties can sign in to chat with others, or private, such as where each individual first downloads an instant messaging client application onto one's computing device and selects which party to be included in its instant messaging list of parties. Another variant of instant messaging tools includes a web-based instant messaging client application that provides similar functions as the downloadable instant messaging client application. However, these instant messaging tools have a common shortfall: conversations between the parties are not persisted or permanently stored like the online message boards. In addition, the users need to visit the web site that has the web-based instant messaging application or download the instant messaging application in order to have a chat session. If the users are in web site or using other applications, such chat or conversation session is not available.

Furthermore, these two features serve two distinct purposes and goals: the message board implementation aims to be a public forum for open discussions while the instant messaging are directed to private conversation or chats that are casual. As such, an instant messaging service or tool is not designed for and incapable of recording the entire content of the conversation. Similarly, a message board service is incapable of providing instant messaging because it would require resources on a server to provide the instant conversation channels between one or more users at the same time.

SUMMARY

Embodiments of the invention enhance message boards and instant messaging tools by dynamically providing availability of instant messaging and message boards to any media object over the web or Internet such that the user can instantly enjoy the convenience of instant messaging and message boards in any given web media object. Advantageously, aspects of the invention provide instant message boards over the web or the Internet such that the users do not need to download a specific client-based application. Furthermore, aspects of the invention dynamically enable the instant message boards to leave live comments for a media object on the web or the Internet such that the users can create an instant chat and message session dynamically and immediately associated with the media object. There is no need to visit a particular site where the message board is hosted; users can begin the message discussion or conversations right at the page or site where the media object is rendered or provided to the user. Moreover, according to embodiments of the present invention, conversations are persisted and essentially permanent. Aspects of the invention enhance user experiences in establishing an instant conversation and messaging community conveniently and dynamically.

Alternative aspects of the invention also provide a passive activation of the instant message boards over the web or the Internet such that the users do not need to overtly or expressly activate the instant message boards.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1 is an exemplary block diagram illustrating a system for enabling dynamic live comment according to an embodiment of the invention.

FIGS. 2A to 2H are exemplary screen displays illustrating dynamic live comment capabilities according to an embodiment of the invention.

FIG. 3 is an exemplary flow chart illustrating operation of dynamic live comments according to an embodiment of the invention.

FIG. 4 is a block diagram illustrating an exemplary computer-readable medium implementing storage of aspects of the invention.

Corresponding reference characters indicate corresponding parts throughout the drawings.

DETAILED DESCRIPTION

Figure 2A:
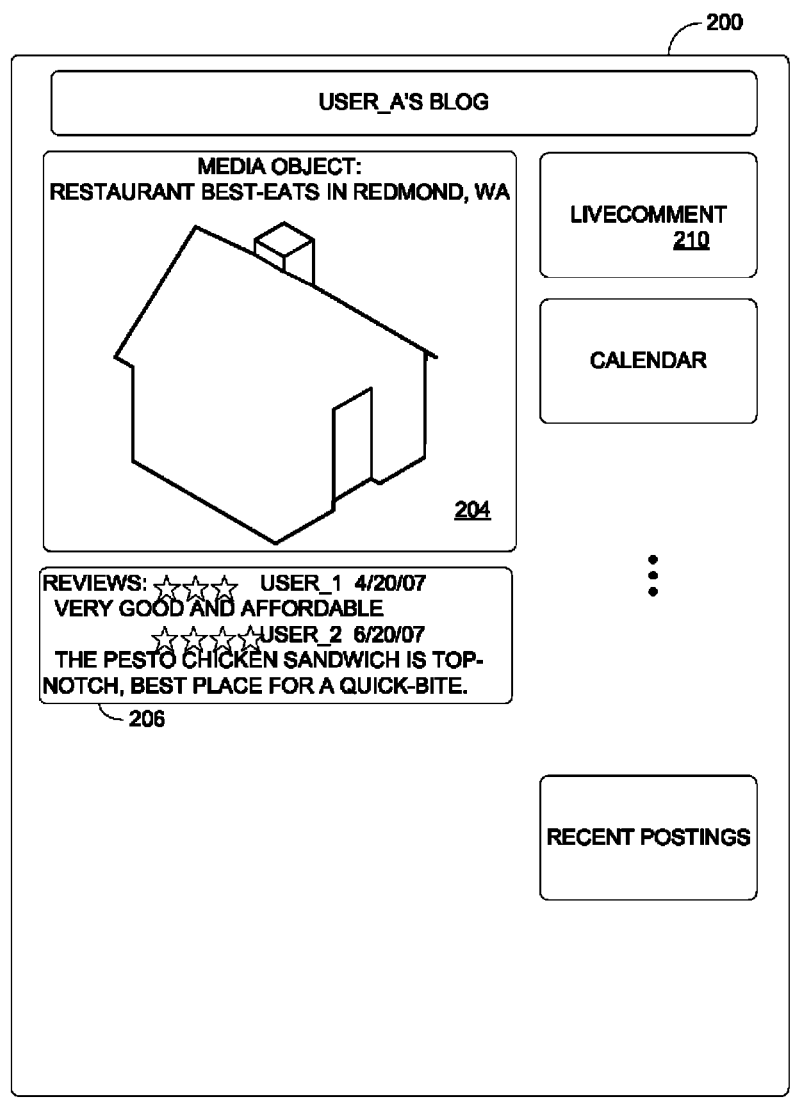

Embodiments of the invention enable dynamic live comments with features of dynamic association with media objects, instant messaging or instant conversation, and persistency of instant chat or conversation sessions as in existing message boards. Referring now to FIG. 1, a block diagram illustrates a system 100 for enabling dynamic live comment according to an embodiment of the invention. The system 100 includes a web server 102 for hosting, managing, and providing services to web users or client applications. For example, the web server 102 may be a general purpose server or computing device having connected via a communication network 104 with other computing devices or servers for providing content to users (e.g., user 108) or client applications. In another embodiment, the web server 102 may also include one or more other servers that are part of a network or a cluster of servers that provide services to users or client applications (hereinafter collectively "users").

The web server 102 includes a web interface 110 for interacting with the user 108. For example, the web interface 110 may be in the form of a web page or a portion of a web page hosted by the web server 102 via the communication network 104. The web page may be part of a web site or a section of a web portal. In an alternative embodiment, the web interface 110 may be part of a web site that is affiliated with the web server 102 through an established business agreement. In a further alternative embodiment, the web interface 110 may be a web page or a part of a web page of a web site that are linked with the web server 102 via the communication network 104, such as a web site hosted by a third party. In one embodiment, the web interface 110 includes one or more web media objects 114. For example, the web media objects 114 may be a graphical media object, a text media object, a message board post, a blog post, a member profile, a video media object, an audio media object, a 3D holographic media object, a combination of the above, and/or inclusion of other media objects not specifically mentioned, including media objects not normally associated with web sites such as avatars or non-player characters in a video game, a contact, a service representation, a radio frequency identification (RFID) tag, or other non-traditional "media" objects. A media object may also include related objects that have been identified by an algorithm or manually aggregated for the convenience of embodiments of the invention.

The system 100 also includes a memory area 112 for storing information associated with web server 102. In one embodiment, the memory area 112 stores data, computer-executable instructions, and/or code representing an instant commenting tool 116. In one embodiment, the memory area 112 may be connected with the web server 102. In another embodiment, the memory area 112 is accessible by the web server 102 via the communication network 104.

In one embodiment, the system 100 provides dynamic live comments or conversations regarding the web media object 114 between users 108. Initially, the web server 102 provides the web interface 110 to the user via the communication network 104. The user 108 visits the web interface 110, for example, when a user 108-1 visits the web interface 110 via a web browser (not shown). The user 108-1 exhibits a desire to interact with the web media object 114 by leaving a comment for the web media object 114. The web interface 110 receives such instruction and, in response to the instruction, the web server 102 activates the instant commenting tool 116. The activated instant commenting tool 116 dynamically provides an instant or live comment session for the user 108-1 to leave live comments for the web media object 114. In one embodiment, the web server 102 may request the user 108-1 to enter authentication credentials (e.g., username and password) before activating the instant commenting tool 116.

Upon finishing leaving the comments, the instant comments are recorded as recorded comments 120 and the memory area 112 stores the recorded comments 120. The persisted or recorded comments 120 are rendered to the user 108-1 as a portion or part of the web interface 110 and associated with the web media object 114.

In an alternative embodiment, the management or administrators of the system 100 may further evaluate the comments left by the users 108. For example, the system 100 may include algorithms that facilitate a filtering of live comments in various contexts so that appropriate comments are presented or rendered to the public over the web or the Internet. For example, the comments may be filtered based on a language context (e.g., filtering offensive language), a user age group context (e.g., a children user group or an adult user group), a media object context (e.g., graphically sensitive media object) or an online environment context (e.g., a chat room or a social chat room group). As such, embodiments of the invention enable the instant comments to be scalable and flexible in implementation and usage such that administrators or content providers can ensure that the most value-added comments are surfaced or rendered.

Also, a further alternative embodiment may include additional applications, codes, software, algorithms or the like that identify or associate the users 108 based on a common factor (e.g., with similar interests) to facilitate more meaningful communications among users 108 with similar interests. This alternative aspect of the invention extends the instant commenting tool 116 from leaving messages or comments associated with the web media object 114 to linking or bring users 108 together in a larger online environment. For example, the system 100 and/or the web interface 110 may be part of a social networking network and the users 108 may each have a trust rating in its user profile (e.g., user profile associated with each user authentication). Embodiments of the invention enable the instant commenting tool 116 to be part of the social networking such that the users 108 may use the instant commenting tool 116 to filter comments based on the trust rating in the user profile of the users, relative to the user who is viewing the comments, who leave comments for the web media object 114. For example, the system 100 may aggregate the trust rating information in the user profile of users 108 and make the aggregated information to the user upon viewing the recorded comments associated with the web media object 114.

In a further embodiment, when a second user 108-2 also visits the same web interface 110 and/or the same web media object 114 while the user 108-1 is leaving the comments, the user 108-2 may also provide instructions to activate the instant comment tooling 116 and leaving comments for the same web media object 114. At the same time, the user 108-1 and the user 108-2 may dynamically and instantly engage in a live conversation or chat during the same live commenting session between each other. In the same token, when additional users, such as user 108-3, visit the same web interface 110 and the same web media object 114, other users may also jointly leaving messages and be engaged in the same conversation.

In an embodiment in which authentication credentials are needed, upon supplying the authentication credentials, the status of any user who joins or visits the same web interface 110 is displayed. For example, after the credentials of the user 108-1 are verified, a status of the user 108-1 may be displayed as "ON-LINE". This status enables other users, such as the user 108-2, to identify those who are currently available in an online environment created in response to the activation of the instant commenting tool 116. If desired, user 108-2 can join the user 108-1 in the instant or live comment session in the online environment. As such, embodiments of the invention create a web-based instant comment session to have an instant conversation that is attached specifically to a particular object, whether a photo, message board post, or anything else. Users can interact with one another about an object with no prior planning or preparation. In other words, two or more users are viewing an object at the same moment. Later, other users are able to view the conversations that have taken place regarding an object, and perhaps start a conversation of their own when they also join the online environment. Furthermore, with the online environment and the instant comment session, the user experience of the web interface 110 and/or the web media object 114 is enhanced as users have an immediate connection with other users who are simultaneously visiting the exact same piece of content, as well as a means for asynchronous communication for future viewers.

In yet another embodiment, the instant commenting tool 116 is automatically enabled and activated upon rendering the web media object 114 to the users 108. Therefore, the users 108 do not need to perform additional operations to sign-in or proceed through the authentication (e.g., username/password pair) process to activate the instant commenting tool 116.

In an alternative embodiment of the invention, a peer to peer network connection may be established between two users when both users are "ON-LINE." For example, a peer-to-peer network may be established based on a peer-to-peer network protocol or an instant messaging protocol triggered by the ON-LINE statuses of any given two users.

FIGS. 2A to 2H illustrate exemplary screen displays showing dynamic live comments according to an embodiment of the invention. In FIG. 2A, a web page 200 (e.g., web interface 110) displays a user's web log "USER-A's BLOG" (commonly referred to as a "blog") with content. Among other objects, data, and content on the web page 200, a media object 204 includes information, such as a photo of a restaurant in Redmond, Wash. The web page 200 also includes a comment section 206, which includes comments or reviews left by users or web visitors regarding the food or services of the restaurant identified by the media object 204. The web page 200 also includes a reference or a link to a livecomment tool 210 (e.g., instant commenting tool 116 in FIG. 1) for activating or creating an online environment with instant comment session. The web page 200 also includes other content, such as the user's calendar or recent postings to the blog entries. It is to be understood that the web page 200 may include other graphical representations, rendered objects, or text representations for the media object 204, the livecomment tool 210, and the comment section 206 without departing from the scope and spirit of the invention.

Figure 2B:
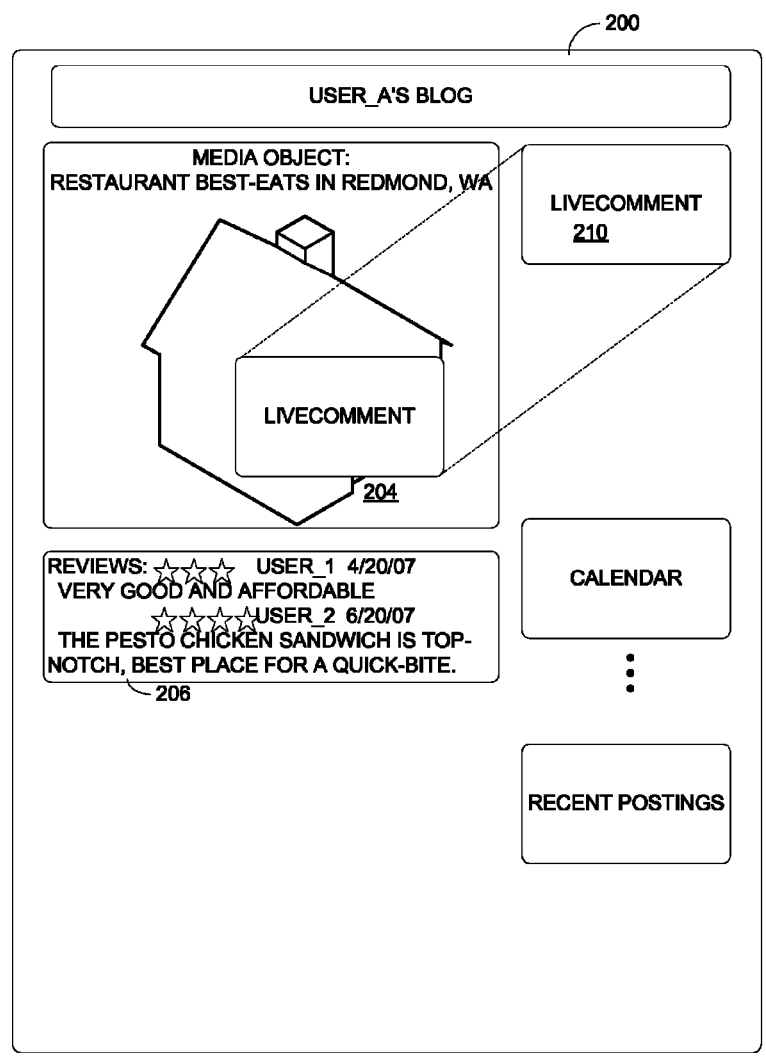

Referring now to FIG. 2B, a user_B visits the web page 200 and wishes to leave comments or feedbacks to the same media object 204. In doing so, the user_B activates the livecomment tool 210 by drag-and-drop the graphical representation of the livecomment tool 210 to the location of the graphical representation of the media object 204. In another embodiment, other user interaction means apart from the drag-and-drop may be used in activating the livecomment tool 210. In another embodiment, the livecomment tool 210 may be rendered or presented to the user_B as an online or graphical user interface (GUI) widget or control that enables to the user to interact with web contents and activate applications or programs hosted by a server. In another embodiment, the livecomment tool 210 may be activated for all objects on a page via a toggle mechanism (not shown) which turns on or off the livecomment tool 210 for all media objects on the page such that simply interacting or providing input to the livecomment tool 210 automatically activates it in the context of the user (e.g., user 108). The toggle mechanism may be used to selectively show or hide the livecomment tool 210 so that it does not obstruct the flow of the original content. In such example, a mechanism such as hovering the mouse over the media object would reveal the livecomment tool 210 for interaction. Other techniques or mechanisms may be used to render the availability of the livecomment tool 210 without departing from the scope or spirit of embodiments of the invention.

Figure 2C:
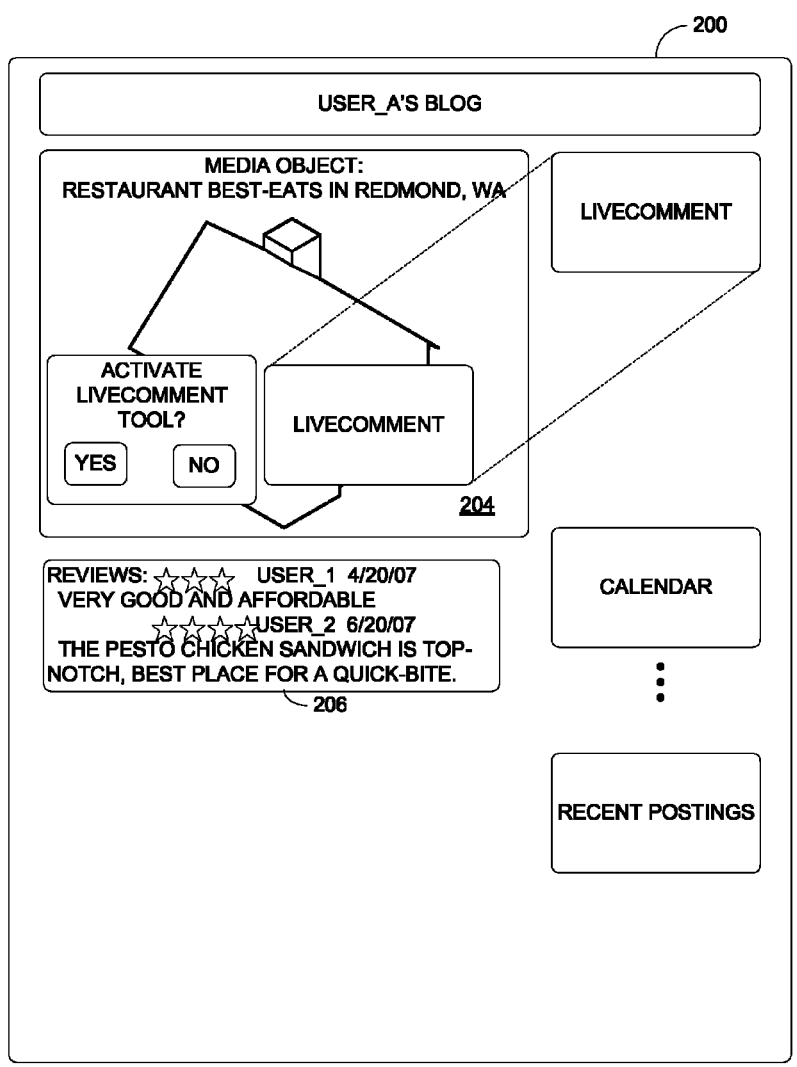
Figure 2D:
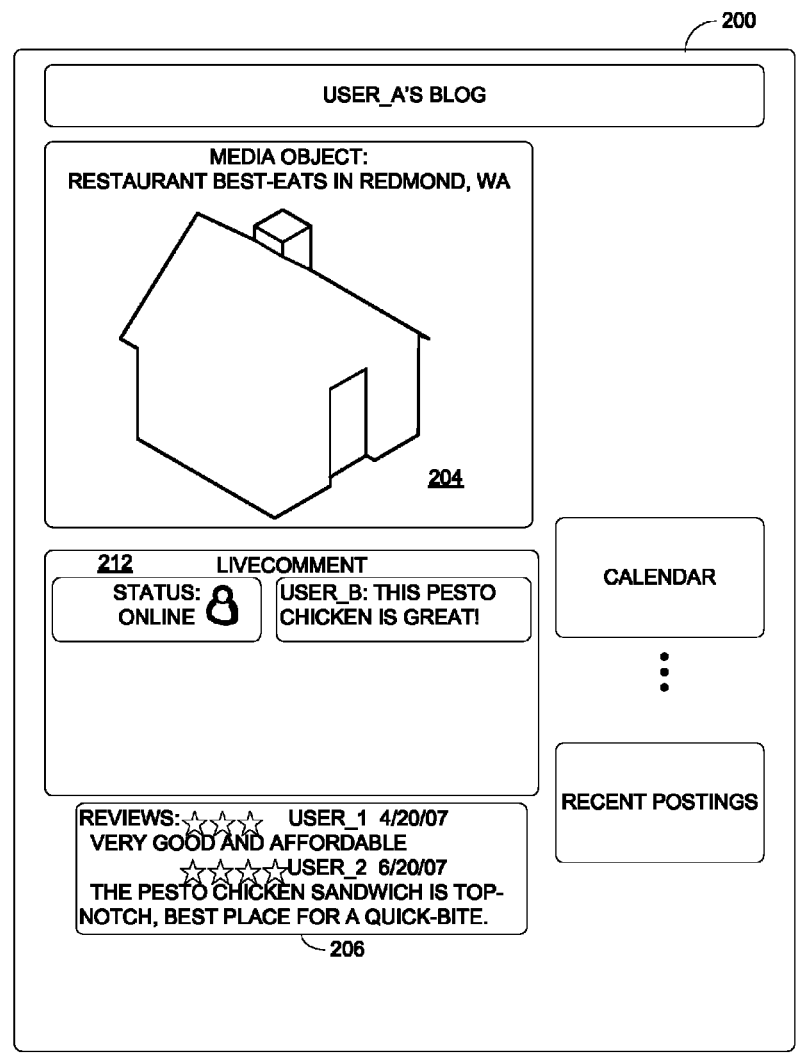

Referring now to FIG. 2C, the user_B may be alerted or requested to confirm the activation of the livecomment tool 210. In one embodiment, the user_B may be asked to enter the proper credentials before activating the livecomment tool 210. FIG. 2D, the livecomment tool 210 is activated and the web page 200 now includes an online environment with an instant comment session 212. A status of the user_B is now displayed as "ONLINE" and the user_B instantly provides instant comments for the media object 204 as "THIS PESTO CHICKEN IS GREAT."

Figure 2E:
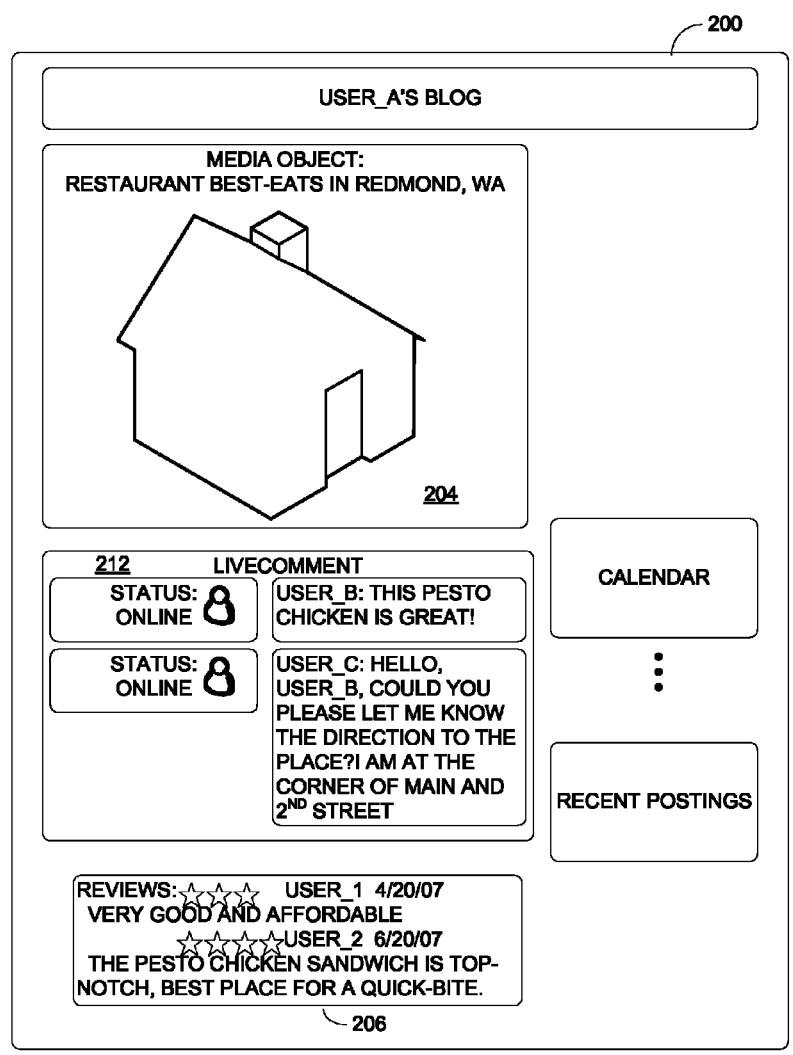
Figure 2H:
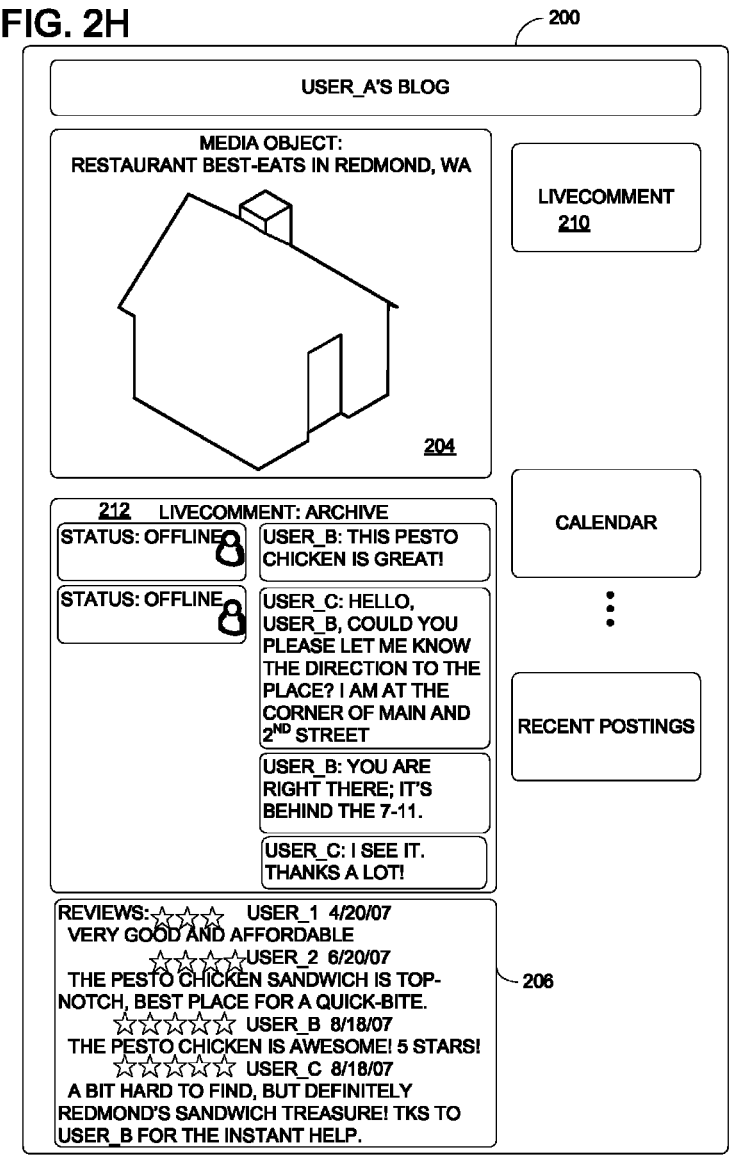

In an instant, another user, user_C also visits the same web page 200 and activates the livecomment tool 210. At the same time, the user_C notices that the status of user_B is ONLINE and joins the instant comment session 212 by engaging a conversation with user_B in the instant comment session. For example and as illustrated in FIG. 2E, user_C begins a conversation by posing a question to user_B: "Hello, user_B, could you please let me know the direction to the place? I am at the corner of main and 2nd street." In one example, the availability of the ONLINE status for a user may be controlled by an algorithm that takes into account various data points such as, but not limited to, the privacy settings of the user, the communication preferences of the user, the age of the comment, the specific geographic or logical location (e.g., viewing the same media object on different web pages), or of the user, the relative trustworthiness of the user, maximum simultaneous users in a single instance of a live comment, relative taxonomy of comment contents, and other factors. The selection of comments available for viewing, and the representation of those comments for any particular user may also depend on these algorithms.

A further embodiment of the invention provides filters to choose the algorithms available for use. The availability of those filters, again, may be based on a different algorithm or a different portion or component of the system (e.g., system 100). In another embodiment, the livecomment tool 210 includes the ability to mark up the media object to which it is attached, for example, by overlaying information, or directly modifying the media object. Modification can be additive, destructive, or any other combination of modes. In some cases the owner of the media object may control the level of mark-up allowed. In the case that a media object is directly manipulated, a history of change threads may be maintained so that the state of the media object may be revealed as it was at any point in time. A change thread may be deleted by the owner(s) of an object. A media object may be modeled in a way that allows several related media objects to be considered as a single media object for the purpose and scope of embodiments of the invention.

In FIG. 2F, the user_B can then instantly respond to the question in the instant comment session in this online environment and indicated, "You are right there; it's behind the 7-11." Consequently, user_C responds to user_B in FIG. 2G: "I see it. Thanks a lot!"

In FIG. 2G, when both user_B and user_C have signed off or "left" the instant comment session 212, their conversations are persisted and remain permanently with the media object 204. In addition, the comment section 206 also persists and, thus, includes their comments. As such, other users or visitors who visit the same web page 200 at a later time can not only begin a separate instant comment session 212 using the livecomment tool 210 but also review the conversations or comments left by previous visitors. Embodiments of the invention advantageously provide the instantaneous availability of an instant chat or conversation session as an existing instant messaging tool and a persistent or permanent feature of an existing message board. Embodiments of the invention also enhance these two existing tools by providing the features dynamically to any media object or web media object so that the features are not bound by or restricted to a particular web site or web portal. These two stand-alone features serve two distinct purposes and goals: the message board implementation aims to be a public forum for open discussions while the instant messaging are directed to private conversation or chats that may be casual and lengthy. In other words, existing implements instant messaging aim to keep conversations in private domain and do not permanently make conversations public, and implementations of the message boards persist comments or discussions permanently without reserving resources for keeping track of the status of the user when leaving the comments. As such, any given user in the message board is left guessing whether another user is also available at the message board at the same time. Embodiments of the invention fill this gap and provide additional feature to dynamically make these features to any web media object.

Referring next to FIG. 3, a flow chart illustrates operation of dynamic live comments according to an embodiment of the invention. For example, where the web server 102 and the web interface 110 are employed, a first instruction is received from a first user for activating an instant comment tool (e.g., instant commenting tool 116) for enabling instant comment on a web media object (e.g., web media object 114) in an online environment at 302. At 304, the web media object is identified by the activated instant commenting tool in response to the received first instruction. An instant comment session is provided to the first user to leave comments to the web media object at 306. The comments are recorded from the first user from the provided instant comment session at 308. For example, the comments are recorded to the memory area 112 in the system 100. At 310, the recorded comments are rendered as a persistent portion of the web media object on the online environment.

In another embodiment, it is determined at 312 whether an additional user is in the same online environment (e.g., whether the additional user has visited the same web interface 110). If the determination is positive, instructions from the additional user to activate the instant commenting tool are received at 314 and the instant commenting tool performs the operation(s) to identify the web media object and provide the instant comment session to the users as in 304 and 306. If the determination is negative, the web media object is rendered, like in 310, with the recorded comments as the persisted or permanent portion of the web media object on the online environment. At 316, another determination is made whether the users in the same online environment wish to engage in a conversation or chat session. If the determination is positive, the conversations are recorded as in 308 and the recorded comments/conversations are rendered as a persistent portion of the web media object. If the determination is negative, the comments provided by the user 108-2 are recorded, just as the comments from the user 108-1 are recorded at 308. In one example, the recorded comments of the user 108-2 and the user 108-1 may appear in either chronological order or reverse chronological order. Both recorded comments are next rendered showing the recorded comments as a persisted or permanent portion of the web media object in the same online environment.

In one embodiment, FIG. 4 is a block diagram illustrating an exemplary computer-readable medium 400 having computer-executable components stored thereon embodying aspects of the invention. In FIG. 4, the computer-executable components on the computer-readable medium 400 execute the operations illustrated in FIG. 3. For example, an instant commenting component 402 receives a first instruction (e.g., drag-and-drop action) from a first user (e.g., user 108-1) for enabling instant commenting on a web media object on an online environment. An interface component 404 accessible to the instant commenting component via the communications network receives a first instruction from a first user for activating instant commenting component 402. The interface component 404 receives the first instruction from the first user and the instant commenting component 402 identifies the web media object via an identification associated with the web media object and in response to the received first instruction. In one embodiment, the instant commenting component 402 provides an instant comment session to the first user to leave comments to the web media object. A memory component 406 accessible via the communication network records or stores the comments from the first user from the provided instant comment session. The comments are associated with the identification (e.g., an object ID 408) of the web media object. The instant commenting component 402 renders the recorded comments as a persistent portion of the web media object on the online environment.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for dynamically providing instant comments, said method comprising:

identifying a publicly available web media object in a web page, said publicly available web media object being associated with an instant commenting tool in an online environment, said instant commenting tool being available to a first user for activation in the web page;

receiving input from the first user attempting to activate the instant commenting tool associated with the publicly available web media object;

requesting authentication from the first user before activating the instant commenting tool;

activating the instant commenting tool in response to authentication from the first user, said authentication associating the first user with a first user profile;

in response to the activated instant commenting tool, providing an instant comment session to the first user for leaving one or more comments to the publicly available web media object, said one or more comments including at least the following: chat content exchanged between the first user and one or more other users and message board content, said one or more other users each having an associated user profile, wherein the first user and the one or more other users are associated based on a common user profile factor;

recording the comments from the first user and the one or more other users from the provided instant comment session as a persistent portion of the publicly available web media object; and rendering the recorded comments of the publicly available web media object for display to the first user in the online environment, said displayed recorded comments being filtered to remove one or more particular comments from the displayed recorded comments according to one or more contexts including information in the user profiles of the one or more other users.

2. The method of claim 1, further comprising receiving one or more instructions from one or more users for activating the instant commenting tool for leaving one or more comments to the web media object on the available web page, wherein the instant commenting tool identifies the web media object in response to the one or more instructions, and said received one or more instructions enabling instant commenting in the online environment on the identified web media object associated therewith.

3. The method of claim 2, further comprising enabling the one or more users to engage in conversations in the same instant comment session with the first user and to leave comments to the web media object, wherein recording comprises recording the engaged conversations between the first user and the one or more users in the instant comment session and the comments to the web media object.

4. The method of claim 1, said one or more contexts including at least one or more of the following: a language context, a user age group context, a media object context, a privacy settings of the user, a communication preference of a user, a specific geographic or logical location of the web media object or of the user, a relative trustworthiness of the user, maximum simultaneous users in a single instance of the online environment, a relative taxonomy of comment contents, and an online environment context.

5. The method of claim 1, further comprising requesting authentication from the first user or the one or more users before providing the instant comment session, said requested authentication comprising a log-in session.

6. The method of claim 1, wherein the web media object comprises one or more of the following: a graphical media object, a text media object, a message board post, a blog post, a member profile, a video media object, an audio media object, a 3D holographic media object, avatars or non-player characters in a video game, a contact, a service representation, and a radio frequency identification (RFID) tag.

7. A system for dynamically providing instant comments, said system comprising:

a web server computing device accessible via a communication network for providing an instant commenting tool, said instant commenting tool enabling instant commenting on a publicly available web media object in a web page, said web media content being associated in an online environment with an instant comment session hosted by the web server computing device, said publicly available web media object being accessible by the web server computing device via the communication network, said instant commenting tool being available to a first user for activation in the web page;

a web interface accessible to the web server computing device via the communication network for receiving a first instruction from the first user for activating said instant commenting tool in the web page;

wherein the web server computing device is configured to receive the first instruction via the web interface from the first user attempting to activate the instant commenting tool and identify the web media object associated with the instant commenting tool in response to the received first instruction, wherein the web server computing device requests authentication from the first user before activating the instant commenting tool, wherein the web server computing device activates the instant commenting tool in response to authentication from the first user, said authentication associating the first user with a first user profile, in response to the activated instant commenting tool, said instant commenting tool providing an instant comment session to the first user to leave comments to the web media object; and a memory accessible by the web server computing device via the communication network for recording the comments from the first user from the provided instant comment session as a persistent portion of the web media object;

wherein the web interface receives one or more additional instructions from one or more additional users for activating the instant commenting tool for leaving comments to the web media object, each additional user having an associated user profile, wherein the instant commenting tool identifies the web media object in response to the one or more instructions, and wherein the web interface further enables the one or more additional users to engage conversations in the same instant comment session with the first user and to leave comments to the web media object;

wherein the web server computing device is further configured to render the recorded comments of the web media object for display in the online environment, said displayed recorded comments being filtered to remove one or more particular comments from the displayed recorded comments according to one or more contexts including information in the user profiles of the one or more additional users.

8. The system of claim 7, wherein said one or more contexts include at least one or more of the following: a language context, a user age group context, a media object context, a privacy settings of the user, a communication preference of a user, a specific geographic or logical location of the web media object or of the user, a relative trustworthiness of the user, maximum simultaneous users in a single instance of the online environment, a relative taxonomy of comment contents, and an online environment context.

9. The system of claim 7, wherein the memory records the engaged conversations between the first user and the one or more additional users in the instant comment session and the comments to the web media object.

10. The system of claim 9, wherein the web server computing device renders the recorded conversations and the comments as the persistent portion of the web media object on the online environment.

11. The system of claim 7, wherein the web media object comprises one or more of the following: a graphical media object, a text media object, a message board post, a blog post, a member profile, a video media object, an audio media object, a 3D holographic media object, avatars or non-player characters in a video game, a contact, a service representation, and a radio frequency identification (RFID) tag.

12. A tangible computer-readable storage device having computer-executable components stored thereon for dynamically providing instant comments, said computer-executable components comprising:
- an instant commenting component in a web page for enabling instant commenting on a publicly available web media object in the web page in an online environment hosted by a web server, said publicly available web media object being accessible by the web server via the communication network, said activated instant commenting tool being available for activation by a first user in the web page;
- an interface component accessible to the instant commenting component via the communications network for receiving a first instruction from the first user to activate the instant commenting component;
  - in response to receiving the first instruction by the interface component, the interface component requesting authentication from the first user before activating the instant commenting tool, wherein the instant commenting component is activated in response to the authentication from the first user and identifies the web media object via an identification associated with the web media object and in response to the received first instruction, said authentication associating the first user with a first user profile;
  - wherein the instant commenting component provides an instant comment session to the first user to leave comments to the publicly available web media object, said comments including chat content exchanged between the first user and one or more other users, said one or more other users each having an associated user profile, wherein the first user and the one or more other users are associated based on a common user profile factor;
- a memory component accessible via the communication network for recording the comments from the first user and the one or more other users from the provided instant comment session as a persistent portion of the web media object, said comments being associated with the identification of the web media object; and
- wherein the instant commenting component renders the recorded comments of the web media object for display to the first user in the online environment, said displayed recorded comments being filtered to remove one or more particular comments from the displayed recorded comments according to one or more contexts including a trust rating of the one or more other users, said trust rating being relative to the first user.

13. The tangible computer-readable storage device of claim 12, wherein the interface component receives one or more additional instructions from one or more additional users for activating the instant commenting component for leaving comments to the web media object, wherein the instant commenting component identifies the web media object via the identification and in response to the one or more instructions, and wherein the interface component further enables the one or more users to engage conversations in the same instant comment session with the first user and to leave comments to the web media object.

14. The tangible computer-readable storage device of claim 13, said one or more contexts including at least one of a language context, a user age group context, a media object context, a privacy settings of the user, a communication preference of a user, a specific geographic or logical location of the web media object or of the user, a relative trustworthiness of the user, maximum simultaneous users in a single instance of the online environment, a relative taxonomy of comment contents, and an online environment context.

15. The tangible computer-readable storage device of claim 14, wherein the memory component records the engaged conversations between the first user and the one or more additional users in the instant comment session and the comments to the web media object.

16. The tangible computer-readable storage device of claim 15, wherein the instant commenting component renders the recorded conversations and the comments as the persistent portion of the web media object on the online environment.

17. The tangible computer-readable storage device of claim 13, wherein the web media object comprises one or more of the following: a graphical media object, a text media object, a message board post, a blog post, a member profile, a video media object, an audio media object, a 3D holographic media object, avatars or non-player characters in a video game, a contact, a service representation, and a radio frequency identification (RFID) tag.

* * * * *